(12) United States Patent
Parikh et al.

(10) Patent No.: US 8,788,371 B2
(45) Date of Patent: Jul. 22, 2014

(54) PERSONALIZED SEARCH WIDGETS FOR CUSTOMIZED USER INTERFACE

(75) Inventors: Nishith Parikh, San Jose, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 401 days.

(21) Appl. No.: 12/903,572

(22) Filed: Oct. 13, 2010

(65) Prior Publication Data
US 2011/0295720 A1   Dec. 1, 2011

Related U.S. Application Data

(60) Provisional application No. 61/348,598, filed on May 26, 2010.

(51) Int. Cl.
G06Q 30/00 (2012.01)
G06Q 30/06 (2012.01)

(52) U.S. Cl.
CPC ................ *G06Q 30/0641* (2013.01)
USPC ...................................... 705/27.1

(58) Field of Classification Search
CPC ................................. G06Q 30/0641
USPC .......... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 7,523,099 | B1 * | 4/2009 | Egnor et al. | 1/1 |
| 7,680,778 | B2 * | 3/2010 | Middha et al. | 707/999.003 |
| 7,792,821 | B2 * | 9/2010 | Shakib et al. | 707/714 |
| 7,898,394 | B2 * | 3/2011 | Hibbets | 707/707 |
| 7,979,313 | B1 * | 7/2011 | Baar | 705/26.1 |
| 8,019,648 | B2 * | 9/2011 | King et al. | 705/26.1 |
| 8,429,690 | B2 * | 4/2013 | Matsuda et al. | 725/46 |
| 8,442,883 | B2 * | 5/2013 | Rashid | 705/35 |
| 8,442,972 | B2 * | 5/2013 | Ismalon | 707/722 |
| 8,639,679 | B1 * | 1/2014 | Zhou | 707/706 |
| 2005/0216454 | A1 * | 9/2005 | Diab et al. | 707/3 |
| 2007/0078758 | A1 * | 4/2007 | Susskind et al. | 705/38 |
| 2007/0185777 | A1 * | 8/2007 | Pyle et al. | 705/26 |
| 2009/0313158 | A1 * | 12/2009 | Del Monte | 705/35 |

OTHER PUBLICATIONS

Berinstein, Paula "Turning Visual: Image Search Engines on the Web", Online; May/Jun. 1998; 22, 3; ABI/INFORM200 Professional Advanced p. 37.*

* cited by examiner

*Primary Examiner* — Naeem Haq
(74) *Attorney, Agent, or Firm* — Schwegman Lundberg & Woessner, P.A.

(57) ABSTRACT

A set of personalized search widgets for providing a customized user interface are provided. Among the personalized search widgets include a related searches menu to depict related search terms according to popularity and type. A query builder for explicitly including or excluding particular terms from the query may be provided. The search widgets may further include a history of past searches received from a user, a selection of categories to be searched, and one or more category suggestions. Some widgets associated with sellers allow a user to filter results according to a trusted seller status of the seller or the identity of the seller, and provide to the user a tag cloud including feedback about the seller. The results of a search may be presented in a spreadsheet style format.

18 Claims, 6 Drawing Sheets

FIG. 1

| bose speakers | | All Categories | × | Search | H |

Related searches: bose cube speakers  bose computer speakers  speakers  bose 901 speakers  bose car speakers  bose outdoor speakers
bose used bose speakers  bose accoustimass Desirable   + cube –   + acoustimass –   + speakers –   + bose –
Not Desirable   + amplifier –   + cd –   + new –   + radio –   >>

Final search phrase
bose speakers

Search results for "bose speakers"
5938 items found - 200 items returned
View columns

Buyers typically buy from these Categories after searching for bose speakers? — 204

All Categories
+ Electronics (139)

| Item Title | Price | Bids | Time Left | Seller | Fdbk Score | Positive Fdbk |
|---|---|---|---|---|---|---|
| Vintage BOSE 901 SERIES V Speakers ~ PAIR ~ LOOK<br>Electronics > Home Audio > Subwoofers<br>View Similar Items | $299.99 | 0 | 6d 10h 47m | tubejunkie2 | 1385 | 99.8% |
| BOSE ACOUSTIMASS 7 HOME THEATRE SPEAKER GOOD CONDITION<br>Electronics > Home Audio > Subwoofers<br>View Similar Items | $99.00 | 8 | 1m | charlie66_2000 | 250 | 100% |

PERSONALIZED SEARCH WIDGETS FOR CUSTOMIZED USER INTERFACE

PRIORITY CLAIM

This application claims the priority benefit of U.S. Provisional Application No. 61/348,598, filed May 26, 2010 and entitled "Personalized Search Widgets for Customized User Interface," which is incorporated herein by reference.

TECHNICAL FIELD

The present application relates generally to the technical field of data management and, in one specific example, to personalized search widgets.

BACKGROUND

In online publication systems, a user may search for listings based, for example, on one or more keywords. The search system may then provide search results in a ranked list.

BRIEF DESCRIPTION OF THE DRAWINGS

Some embodiments are illustrated by way of example and not limitation in the figures of the accompanying drawings in which.

DETAILED DESCRIPTION

Example methods and systems to provide personalized search widgets are described. In the following description, for purposes of explanation, numerous specific details are set forth in order to provide a thorough understanding of example embodiments. It will be evident, however, to one skilled in the art that the present invention may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic publication, electronic commerce, or electronic business system and method, including various system architectures, may employ various embodiments of the system and method described herein and be considered as being within a scope of example embodiments. Each of a variety of example embodiments is discussed in detail below.

In an online publication system, the personalized search widgets comprise a collection of customizable search widgets from which a user can select to have displayed on a search user interface. The widgets can be used by the user to select terms that the user believes are most pertinent or relevant to his or her search. The search may be directed to information published on the Internet, or performed in an online marketplace or a social network.

The personalized search widgets may be implemented using one or more application programming interfaces (APIs) that request information from the online publication system to present a set of search results to the user. At least because multiple APIs are used to present the search results, the search results may be presented using a "spreadsheet format." In the spreadsheet format, the user is able to dictate which columns are shown and how the columns are sorted. The columns available for display to the user correspond to a characteristic of the listing such as image, item title, price, number of bids, time remaining in an auction or fixed price sale, seller feedback score, percent positive feedback, shipping costs, etc. Via a user interface, the user is able to select a subset of those columns to display in a second user interface including one or more search results that are provided to the user. Additionally, the user may be able to reorder or arrange the columns. In some instances, the user is allowed to select one or more columns for sorting or re-ordering the search results.

The personalized search widgets may, additionally or alternatively, provide additional assistance to a user in narrowing or refining a search. For example, the search widgets may provide related searches that are color-coded according to whether the related search is a refinement of the submitted search (e.g., directed to a subset of the provided search results) or whether the related search is alternative to the submitted search in some way (e.g., the search may be for similar products, accessories for a searched product, different brands, or the like). The related searches may be presented in varying font sizes based, for example, on the relative popularity of the related searches.

Figure 1:
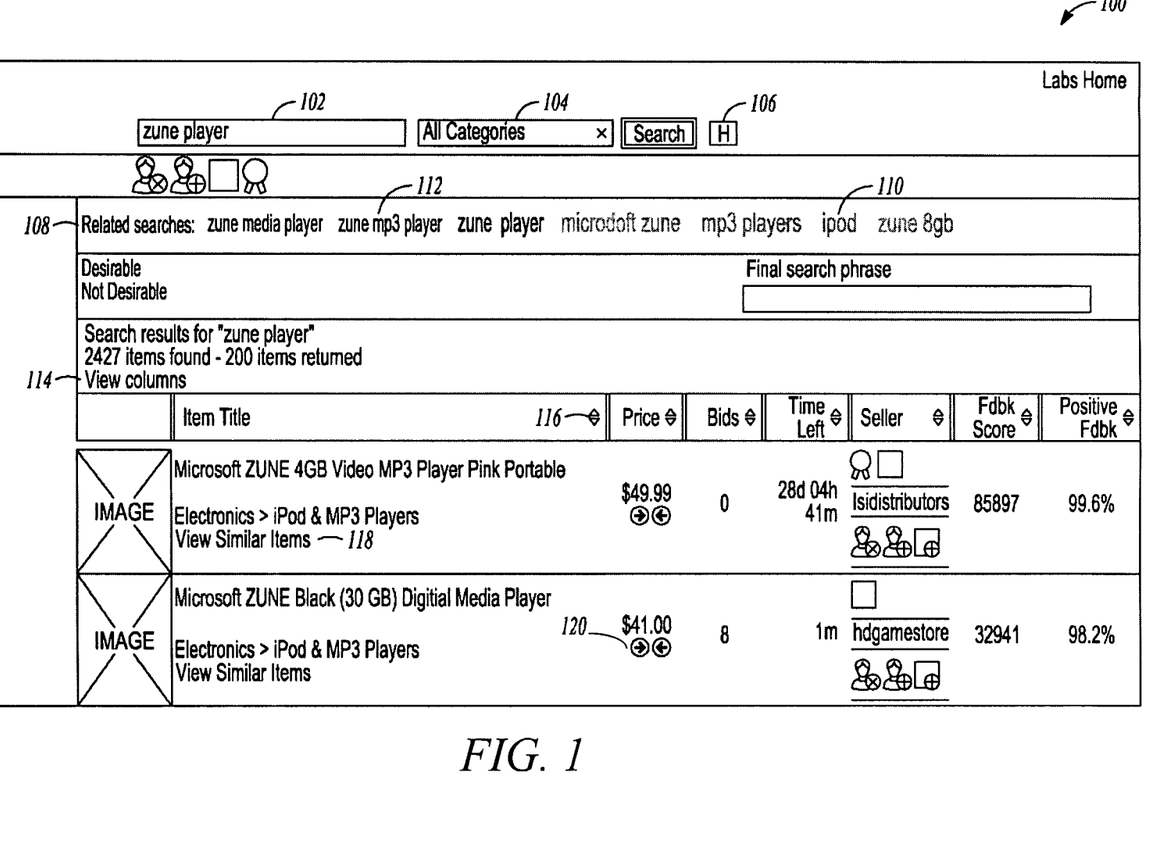
FIG. 1 is a first illustration of a sample search results page according to some embodiments.
Figure 2:
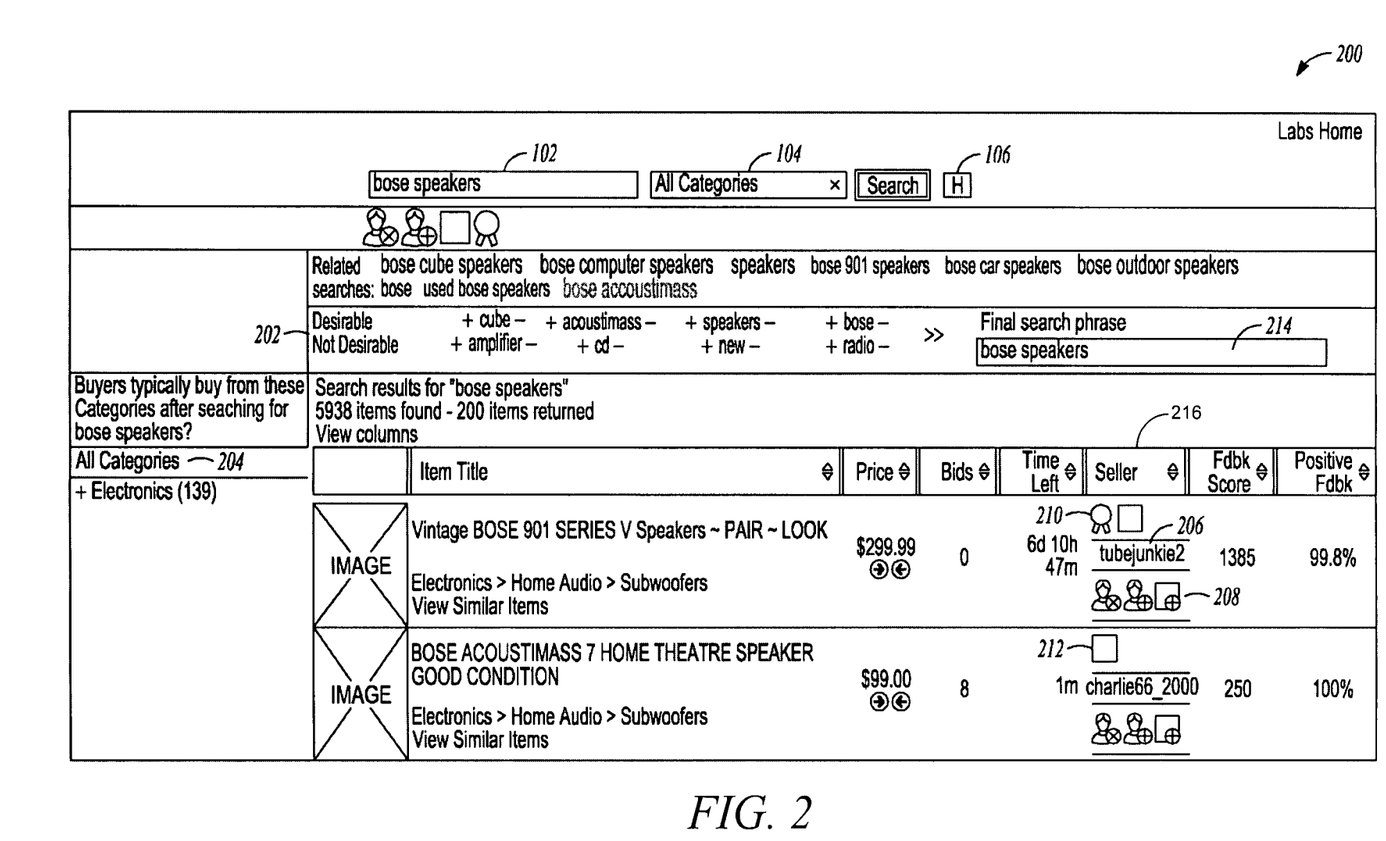
FIG. 2 is a second illustration of a sample search results page according to some embodiments.
Figure 3:
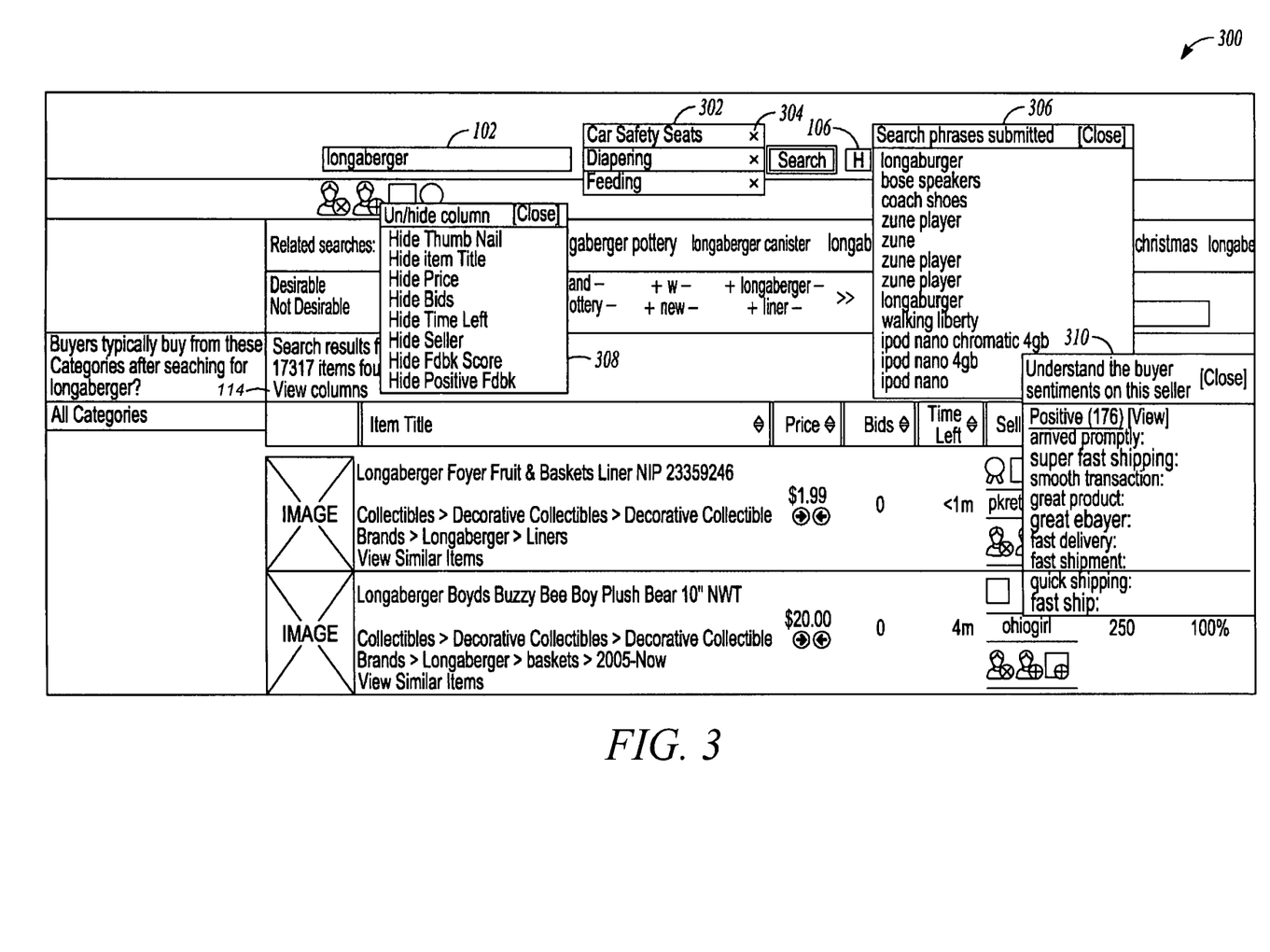
FIG. 3 is a third illustration of a sample search results page according to some embodiments.

The personalized search widgets may additionally include features that allow the user to restrict the results shown based on category, seller, price, or the like. FIGS. 1-3 include a description of the above features, in no particular order, each to be discussed in turn. While the descriptions of FIGS. 1-3 may vary in the combination of features provided to the user, it is to be understood that various combinations of features may be provided in any given embodiment.

FIG. 1 is a first illustration of a sample search results page 100 according to some embodiments. The sample search results page is displayed to a user via a device associated with the user. In the search results of FIG. 1, the user has entered the search phrase "zune player" in a search box 102. The sample search results page includes a drop down category menu 104 to allow a user to select one or more categories of products (e.g., autos, electronics, clothing, collectibles, etc.) across which the user desires to perform the search (described further in connection with FIG. 3). The user may access a history of the user's searches as well by selecting a history button 106.

Below those options, a related search interface 108 includes a selection of related search terms displayed to the user in various font colors and/or font sizes. The color of the font may be varied based on whether the particular search term is provided as an alternative search term 110 (e.g., "ipod" shown in lighter gray) or a refinement 112 of the search terms submitted by the user (e.g., "zune mp3 player" search term shown in black). Examples of related searches that refine the search phrase "zune player" may include "zune media player", "zune mp3 player", "zune", and "player" as shown. Example of related searches that are alternative search terms to the search phrase "zune player" include "Microsoft zune", "mp3 players", "ipod", and "zune 8gb" as shown.

In example embodiments, the font size for each of these related searches may be varied according to a relative popularity of the searches. The related searches appearing in larger fonts may be more popular than the related searches appearing in smaller fonts. For example, the related search term 110 "ipod" is displayed in a larger font size than the related search term 112 "zune media player," indicating that the related search term 110 "ipod" is more popular than the related search term 112 "zune media player."

Also shown in FIG. 1 is the spreadsheet format of the search results. The spreadsheet format allows user to show additional columns or to hide a shown column using a "View columns" link 114 and as further illustrated in FIG. 3. The spreadsheet format generally includes two or more columns. As depicted, the columns include sortable columns (e.g., price) and an unsortable column (e.g., item image). The sortable columns are identifiable as such by a sorting option 116 and include "Item Title," "Price," "Bids" (i.e., number of bids), "Time Left" (i.e., time remaining in an auction or fixed price sale), "Seller," "Feedback (Fdbk) Score," and "Positive Fdbk" (as a percent of feedback). In a non-marketplace environment, the sortable columns may include article title, data of publication, author, and rating.

In the item title, the spreadsheet format further provides an additional similar items link 118 in at least a portion of the search results to "view similar items." Upon selecting the link 118, a user may be shown a page depicting one or more listings of items for sale that are similar to the item described by the listing shown in the search results.

The spreadsheet format may include one or more options to filter the listings shown to a user. As shown in FIG. 1, arrows 120 provided below the price in a particular listing may allow a user to set that item's price as a maximum price or as a minimum price. Upon selecting the price, the search results are filtered to include only those listings priced above or below the selected price.

FIG. 2 is a second illustration of a sample search results page 200 displayed to the user, according to some embodiments. In the page 200 shown in FIG. 2, a query builder 202 that helps a user make a submitted query more specific is provided. The query builder 202 allows a user to explicitly select terms to be excluded or included in the search. The terms are divided initially into "Desirable" terms and "Not Desirable" terms based, in part, on searches submitted by other users or previously by the user. The user may select terms as "desirable" to include those terms in the query or as "not desirable" to exclude the terms from the query. As shown, the submitted query is "bose speakers" and the desirable terms include "cube", "acoustimass", "speakers", and "bose" while the not desirable terms include "amplifier", "cd", "new", and "radio". Based on the selections by the user, a "final search phrase" 214 may be generated by the system by adding or removing search terms. In some instances, a "NOT" operator may be used to exclude undesirable search terms.

FIG. 2 also shows a category filter 204 that suggests, to the user, category filters based on a history of past buyers. In one embodiment, the categories correspond to predefined product categories that users who have submitted similar categories in the past have ultimately purchased one or more items from.

FIG. 2 further depicts features associated with the "seller" column 216 of the spreadsheet format search results. The seller column 216 includes a link 206 to a "seller page" that provides additional information about the seller to the user.

The seller column 216 also includes filter options 208 to exclude a particular seller from the search results or to filter the search results to exclusively show items for sale by that particular seller. A further filter 210 depicted by a "ribbon" icon allows the user to only show items (or to not show items) for sale by "Top Rated Sellers" (TRS). A third filter 212 included in the seller column 216 allows the user to see a tag cloud (or other display) of feedback about the seller. The tag cloud is shown and discussed in more detail in FIG. 3.

FIG. 3 is a third illustration of a sample search results page 300, according to some embodiments. Most features of FIG. 3 were previously discussed in connection with FIGS. 1 and 2 and are shown in greater detail in FIG. 3. First, a menu 302 depicting a simultaneous selection of more than one category in which to perform a search (as described in connection with the category menu 104 of FIG. 1) is shown. As shown, the categories "diapering" and "feeding" are selected by a user. Items associated with either or both of these categories may be removed from the search results by selecting the "x" 304 shown adjacent to the category. To the right of the menu 302, a history of past user searches 306 (as previously discussed in connection with the history button 106 of FIG. 1) are depicted. The history of user searches may be based on, for example, searches within the current session, searches within the most recent predefined number of sessions, searches conducted at least a threshold number of times or with a threshold frequency, or a last pre-defined number of searches over any number of sessions.

As a pop-up window over the spreadsheet format listings, a "view column" menu 308 is shown that allows the user to hide at least a portion of the columns in the spreadsheet. If one or more columns are already hidden, the menu may include an option to show the hidden column(s). The selection of columns may appear automatically or in response to a confirmation received from a user of a particular selection.

As described in connection with FIG. 2, a tag cloud 310 of feedback about the seller is also shown as a snapshot of text appearing in the seller feedback. In one embodiment, the tag cloud 310 is displayed as a pop-up window or menu over the spreadsheet format listing.

It should be noted that while a plurality of pop-up windows or menus are shown in FIG. 3, not all menus may be displayed at once. For example, the history of past user searches 306 may be displayed when the history button 106 is selected, but the "view column" menu 308 and the tag cloud 310 may not be displayed.

Figure 4:
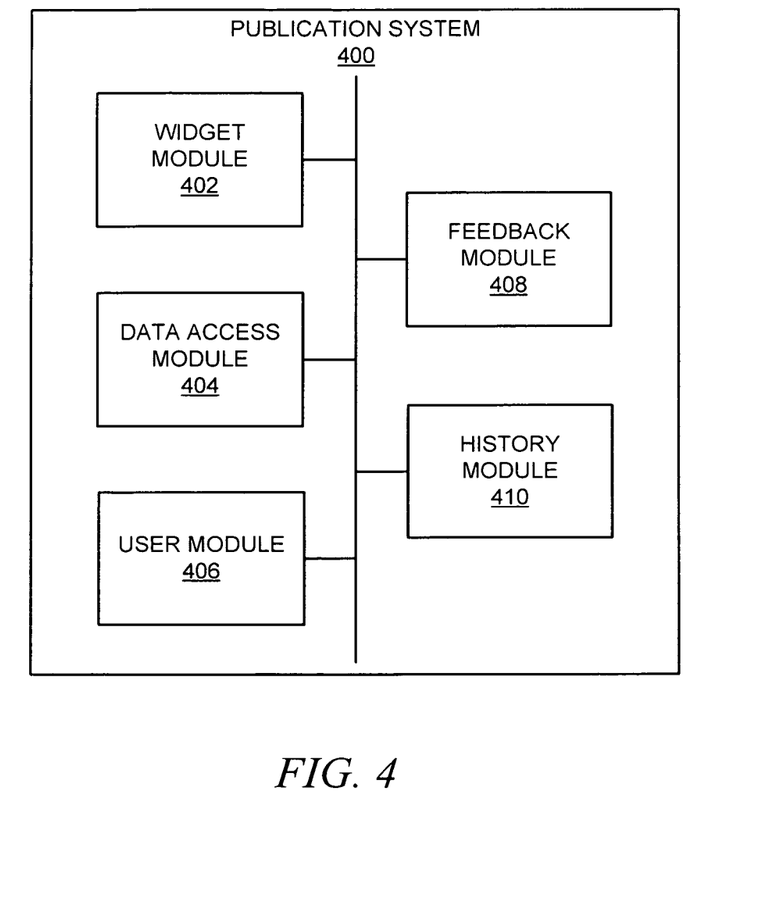
FIG. 4 is a block diagram depicting a publication system according to some embodiments.

Further, it is noted that the components of the sample search results pages 100, 200, and 300 (e.g., related searches, category filter, history of user searches, query builder, etc.) may be laid out in different ways or resized according to a user preference. In some instances, the ability of the user to direct the lay-out and size of the components is limited by the publication system (FIG. 4). Similarly, the user may dictate the size or position of the columns in the spreadsheet format.

FIG. 4 is a block diagram depicting a publication system 400 according to some embodiments. A widget module 402 is to provide the widgets of FIGS. 1-3 to the user device. A data access module 404 is to access the selected data from the publication system 400 and/or another system based on selections. A user module 406 is to manage the users' preferences and past search history. A feedback module 408 is to access and manage the information used in the tag cloud 310 of FIG. 3. A history module 410 manages the past searches of a collection of users to determine with related searches in FIG. 1. Additional or alternative engines may also be included in the publication system 400.

Figure 5:
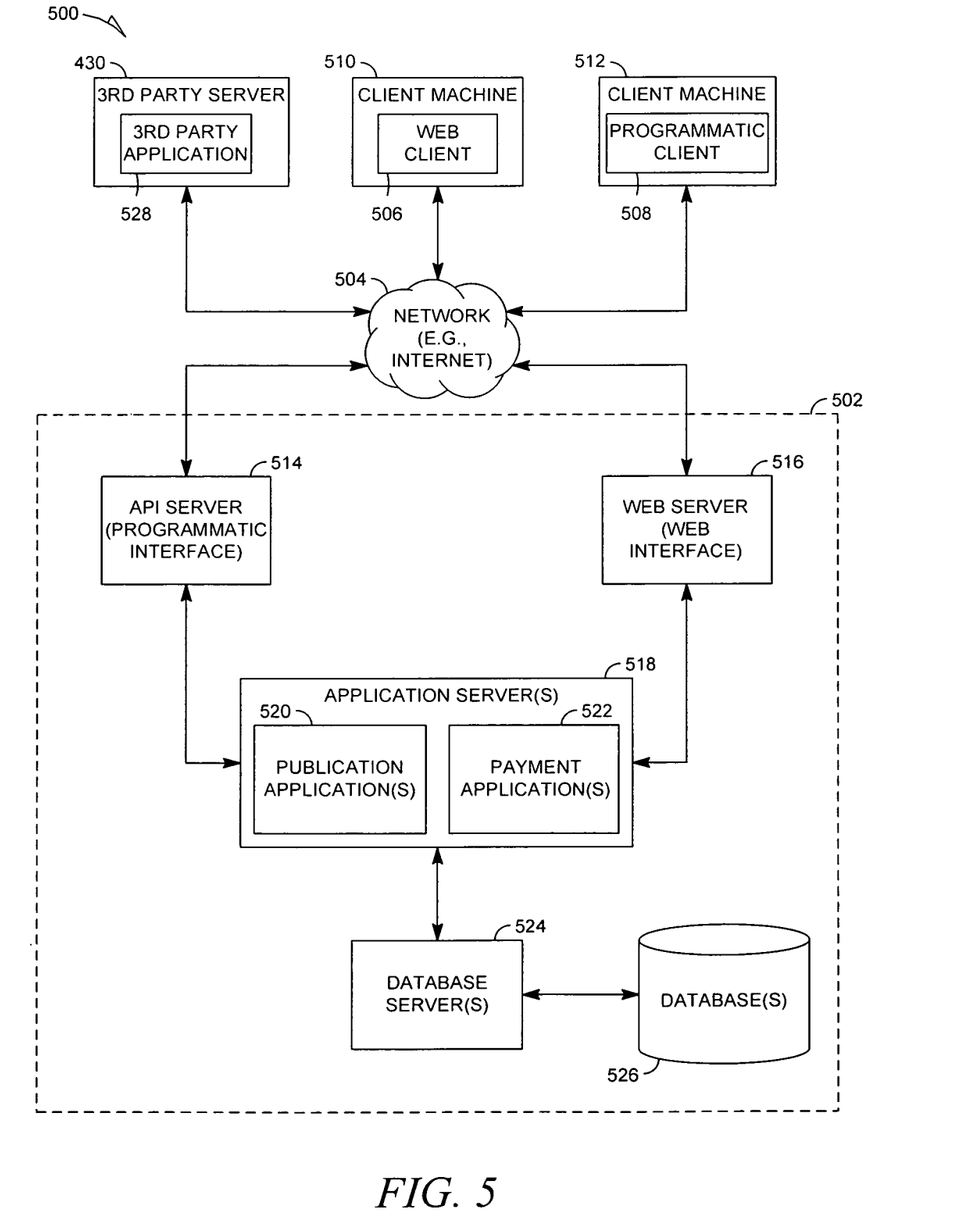
FIG. 5 is a network diagram depicting a client-server system, within which one example embodiment may be deployed.

FIG. 5 is a network diagram depicting a client-server system 500, within which one example embodiment may be deployed. A networked system 502, in the example forms of a network-based marketplace or publication system, provides server-side functionality, via a network 504 (e.g., the Internet or Wide Area Network (WAN)) to one or more clients. FIG. 5 illustrates, for example, a web client 506 (e.g., a browser, such as the Internet Explorer browser developed by Microsoft Corporation of Redmond, Wash. State), and a programmatic client 508 executing on respective client machines 510 and 512.

An Application Program Interface (API) server 514 and a web server 516 are coupled to, and provide programmatic and web interfaces respectively to, one or more application servers 518. The application servers 518 host one or more publication applications 520 and payment applications 522. The application servers 518 are, in turn, shown to be coupled to one or more databases servers 524 that facilitate access to one or more databases 526.

The publication applications 520 may provide a number of publication functions and services to users that access the networked system 502. The payment applications 522 may likewise provide a number of payment services and functions to users. The payment applications 522 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 520. While the publication and payment applications 520 and 522 are shown in FIG. 5 to both form part of the networked system 502, it will be appreciated that, in alternative embodiments, the payment applications 522 may form part of a payment service that is separate and distinct from the networked system 502.

Further, while the system 500 shown in FIG. 5 employs a client-server architecture, the present invention is of course not limited to such an architecture, and could equally well find application in a distributed, or peer-to-peer, architecture system, for example. The various publication and payment applications 520 and 522 could also be implemented as standalone software programs, which do not necessarily have networking capabilities.

The web client 506 accesses the various publication and payment applications 520 and 522 via the web interface supported by the web server 516. Similarly, the programmatic client 508 accesses the various services and functions provided by the publication and payment applications 520 and 522 via the programmatic interface provided by the API server 514. The programmatic client 508 may, for example, be a seller application (e.g., the TurboLister application developed by eBay Inc., of San Jose, Calif.) to enable sellers to author and manage listings on the networked system 502 in an off-line manner, and to perform batch-mode communications between the programmatic client 508 and the networked system 502.

FIG. 5 also illustrates a third party application 528, executing on a third party server machine 530, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more promotional, marketplace, or payment functions that are supported by the relevant applications of the networked system 502.

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 6:
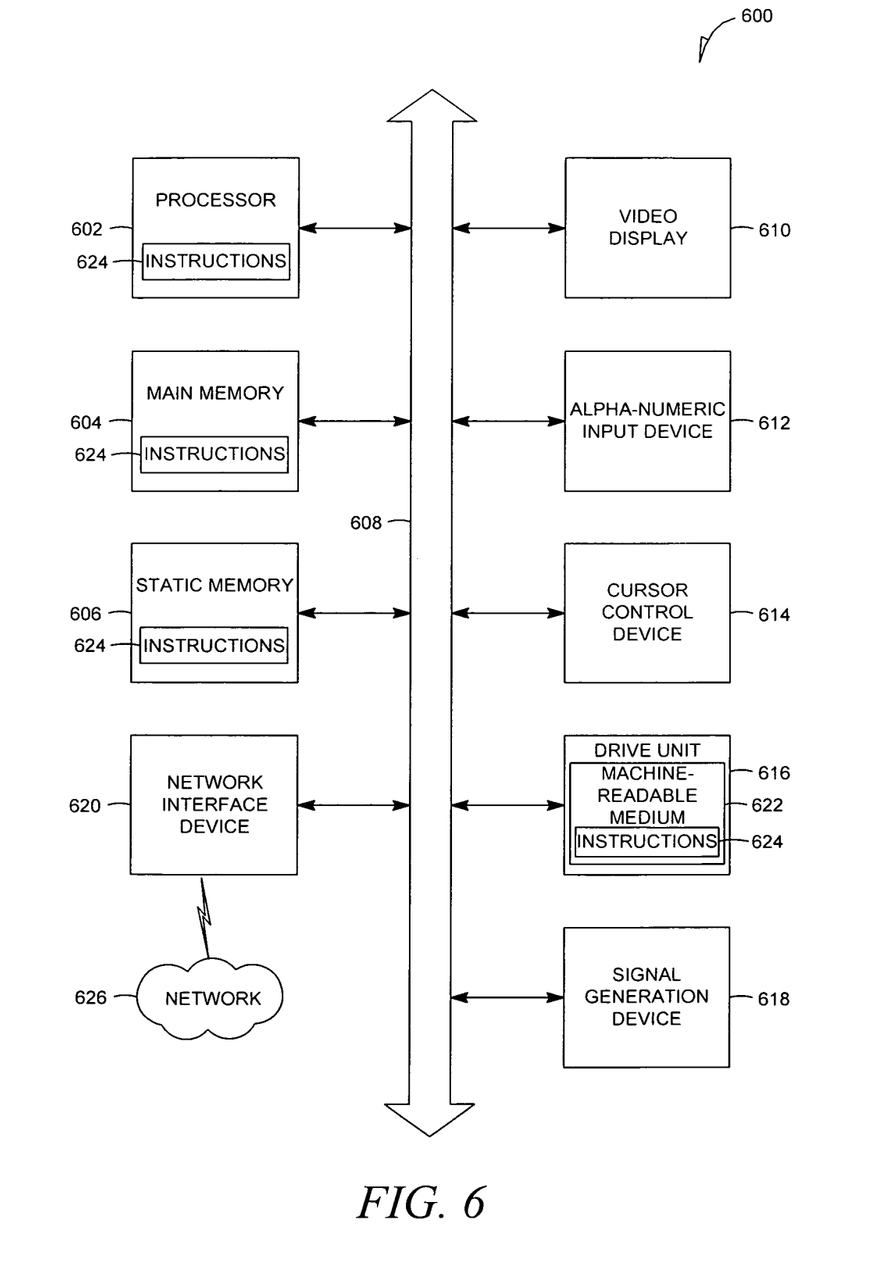
FIG. 6 shows a diagrammatic representation of machine in the example form of a computer system within which a set of instructions, for causing the machine to perform any one or more of the methodologies discussed herein, may be executed.

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media. The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. In one embodiment, the machine-readable medium is a non-transitory machine-readable storage medium.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Thus, a method and system to provide personalized search widgets for a customized user interface have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a search term from a device associated with a user;
determining a set of related search terms, each related search term of the set of related search terms being related to the received search term;
for each related search term of the set of related search terms, determining a status of the related search term as desirable or undesirable based on a plurality of searches previously submitted by the user;
using one or more processors, providing data associated with the set of related search terms to the device, the data associated with the set of related search terms being used by the device to display a related searches menu depicting the set of related search terms according to the status of each related search term of the set of related search terms as desirable or undesirable;
modifying a font color of text of a first displayed related search term to a first color based on the first related search term being a refinement of the search term;
modifying a font color of text of a second displayed related search term to a second color based on the second related search term being an alternative of the search term; and
providing a query builder, the query builder to allow a user to modify the desirable or undesirable status of each displayed related search term and to provide a final search phrase based on a subset of the set of related search terms having the desirable status.

2. The method of claim 1, further comprising providing a spreadsheet format results page, the spreadsheet format results page to allow a user to show or hide one or more columns in a spreadsheet format and to sort according to the one or more columns.

3. The method of claim 1, wherein providing the related searches menu comprises altering the font size of a particular related search term based on the popularity of the related search term.

4. The method of claim 1, further comprising providing a category suggestion adjacent to one or more search results.

5. The method of claim 1, further comprising providing an option to filter search results according to a price associated with a particular listing of an item for sale.

6. The method of claim 1, further comprising accessing a history of search, phrases previously received from the user.

7. The method of claim 1, further comprising filtering search results based on a top rated seller status associated with a listing.

8. The method of claim 1, further comprising providing a snapshot of text appearing in feedback about a seller associated with a listing.

9. The method of claim 1, further comprising filtering search results based on a selection received from the user to exclude a particular seller.

10. The method of claim 1, further comprising filtering search results based on a selection received from the user to include a particular seller.

11. The method of claim 1 wherein the determining the status of each related search term as desirable or undesirable is based on searches previously submitted by the user in a current session.

12. The method of claim 1 wherein the determining the status of each related search term as desirable or undesirable is based on searches previously submitted by the user at least a threshold number of times.

13. The method of claim 1 wherein the determining the status of each related search term as desirable or undesirable is based on searches previously submitted by the user with at least a threshold frequency.

14. The method of claim 1 wherein the determining the status of each related search term as desirable or undesirable is based on a predefined number of searches previously submitted across a plurality of sessions.

15. A system comprising:
a data storage associated with a publication system to store a plurality of listings in a memory;
a data access module to receive a search term from a device associated with a user;
a history module to;
determine a set of related search terms related to the received search term; and
determine, for each related search term of the set of related search terms, a status of the related search term as desirable or undesirable, based on searches previously submitted by the user;
the data access module further to provide data associated with the set of related search terms to the device, the data associated with the set of related search terms being used by the device to display a related searches menu depicting the set of related search terms according to the status of each related search term as desirable or undesirable; and
a widget module to:
provide a query builder, the query builder to allow a user to modify the desirable or undesirable status of each displayed related search term and to provide a final search phrase based on a subset of the set of related search terms having the desirable status;
modify a font color of text of a first related search term in the related searches menu to a first color based on the first related search term being a refinement of the received search term; and
modify a font color of text of a second related search term in the related searches menu to a second color based on the second related search term being an alternative of the received search term.

16. The system of claim 15, wherein the data access module is further to provide a particular listing from the plurality of listings based on a seller associated with the particular listing.

17. The system of claim 15, further comprising a widget module to alter the font size of a particular related search term in the related searches menu based on the popularity of the related search term.

18. A non-transitory machine-readable storage medium having instructions embodied thereon, the instructions executable by a process for performing operations comprising:
receiving a search term from a device associated with a user;
determining a set of search terms related to the received search term;
determining, for each related search term of the set of search terms, a status of the related search term as desirable or undesirable, based on searches previously submitted by the user;
providing data associated with the set of related search terms to the device, the data associated with the related search terms being used by the device to display a related searches menu depicting the set of related search terms according to the status of each related search term of the set of related search terms as desirable or undesirable;
modifying a font color of text of a first displayed related search term to a first color based on the first related search term being a refinement of the search term;
modifying a font color of text of a second displayed related search term to a second color based on the second related search term being an alternative of the search term; and
providing a query builder, the query builder to allow a user to modify the desirable or undesirable status of each related search term of the set of related search terms and to provide a final search phrase based on a subset of the set of related search terms having the desirable status.

* * * * *

UNITED STATES PATENT AND TRADEMARK OFFICE
CERTIFICATE OF CORRECTION

Page 1 of 1

PATENT NO.        : 8,788,371 B2
APPLICATION NO.   : 12/903572
DATED             : July 22, 2014
INVENTOR(S)       : Parikh et al.

It is certified that error appears in the above-identified patent and that said Letters Patent is hereby corrected as shown below:

In the Claims,

In column 9, line 51, in Claim 6, delete "search," and insert --search--, therefor In column 10, line 18, in Claim 15, delete "to;" and insert --to:--, therefor Signed and Sealed this
Eighteenth Day of November, 2014

Michelle K. Lee
*Deputy Director of the United States Patent and Trademark Office*